(12) United States Patent
Lovett

(10) Patent No.: US 6,247,091 B1
(45) Date of Patent: Jun. 12, 2001

(54) METHOD AND SYSTEM FOR COMMUNICATING INTERRUPTS BETWEEN NODES OF A MULTINODE COMPUTER SYSTEM

(75) Inventor: Thomas D. Lovett, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/848,545

(22) Filed: Apr. 28, 1997

(51) Int. Cl.[7] ........................................ G06F 13/24
(52) U.S. Cl. .................... 710/260; 710/266; 710/261; 710/263; 710/264; 710/267; 710/268; 709/251; 709/249; 709/253; 709/230; 370/402
(58) Field of Search ........................... 710/260, 262–264, 710/266, 268, 269; 709/745, 238, 212, 249, 251, 250, 230; 370/392, 402

(56) References Cited

U.S. PATENT DOCUMENTS

| 4,604,500 | * | 8/1986 | Brown et al. | 379/269 |
|---|---|---|---|---|
| 4,768,149 | * | 8/1988 | Konopik et al. | 395/867 |
| 5,109,522 | * | 4/1992 | Lent et al. | 395/500 |
| 5,283,904 | * | 2/1994 | Carson et al. | 395/739 |
| 5,369,748 | * | 11/1994 | McFarland et al. | 711/118 |

(List continued on next page.)

OTHER PUBLICATIONS

"Design of the APIC: A High Performance ATM Host Hetwork Interface Chip", Dittia et al., 1995 IEEE.*

"The APIC Approach to High Performance Network Interface Design: Protected and Other Techniques", Dittia et al., 1997 IEEE.*

"Efficient Interprocessor Communications in a Tightly–Coupled Homogeneous Multiprocessor System", van der Wal et al. 1990 IEEE.*

MultiProcessor Specification, Intel, ver. 1.4, Jul. 1, 1995, Rev. Aug. 1996 (appendix E added)*

*Primary Examiner*—Kevin J. Teska
*Assistant Examiner*—William Thomson
(74) *Attorney, Agent, or Firm*—Klarquist Sparkman Campbell Leigh and Whinston LLP

(57) ABSTRACT

Each node of multinode computer system includes an interrupt controller, a pair of send and receive queues, and a state machine for communicating interrupts between nodes. The communication among the interrupt controller, the state machine, and the queues is coordinated by a queue manager. For sending an interrupt, the interrupt controller accepts an interrupt placed on a bus within the node and intended for another node and stores it in the send queue. The controller then notifies the interrupt source that the interrupt has been accepted before it is transmitted to other node. The interrupt has a first form suitable for transmission on the bus. A state machine within the node takes the interrupt from the send queue and puts the interrupt into a second form suitable for transmission across a network connecting the multiple nodes. For receiving an interrupt, the state machine accepts an interrupt from another node and stores it in the receive queue, notifying the interrupt source that the interrupt has been accepted before its is placed on the node bus. The interrupt has the second form suitable for transmission across the network. The interrupt controller takes the interrupt from the receive queue and puts it in the first form suitable for transmission on the bus.

20 Claims, 11 Drawing Sheets

U.S. PATENT DOCUMENTS

| | | | | |
|---|---|---|---|---|
| 5,428,799 | * | 6/1995 | Woods et al. | 710/266 |
| 5,481,725 | * | 1/1996 | Jayakumar et al. | 710/48 |
| 5,511,200 | * | 4/1996 | Jayakumar | 710/266 |
| 5,566,171 | * | 10/1996 | Levinson | 370/352 |
| 5,598,541 | * | 1/1997 | Malladi | 710/106 |
| 5,623,494 | * | 4/1997 | Rostoker et al. | 370/397 |
| 5,625,563 | * | 4/1997 | Rostoker et al. | 364/488 |
| 5,638,518 | * | 6/1997 | Malladi | 709/251 |
| 5,640,399 | * | 6/1997 | Rostoker et al. | 370/392 |
| 5,678,057 | * | 10/1997 | Rostoker et al. | 712/11 |
| 5,706,514 | * | 1/1998 | Bonola | 709/104 |
| 5,715,274 | * | 2/1998 | Rostoker et al. | 375/200 |
| 5,742,843 | * | 4/1998 | Koyanagi et al. | 712/14 |
| 5,790,530 | * | 8/1998 | Moh et al. | 370/363 |
| 5,832,279 | * | 11/1998 | Rostoker et al. | 710/266 |
| 5,892,956 | * | 4/1999 | Qureshi et al. | 710/260 |
| 5,944,798 | * | 8/1999 | McCarty et al. | 709/251 |

* cited by examiner

METHOD AND SYSTEM FOR COMMUNICATING INTERRUPTS BETWEEN NODES OF A MULTINODE COMPUTER SYSTEM

FIELD OF THE INVENTION

This invention relates generally to multinode computer systems in which a number of separate computing nodes are interconnected to form a larger computer system. More particularly, this invention relates to the efficient communication of interrupts from one node to another.

BACKGROUND OF THE INVENTION

Multiprocessor computers by definition contain multiple processors that can execute multiple parts of a computer program or multiple programs simultaneously. In general this parallel computing executes computer programs faster than conventional single processor computers, such as personal computers (PCs), that execute the parts of a program sequentially. The actual performance advantage is a function of a number of factors, including the degree to which parts of a program can be executed in parallel and the architecture of the particular multiprocessor computer at hand.

These computers may be classified by how they share information among the processors. Shared-memory multiprocessor computers offer a common memory address space that all processors can access. Processes within a program communicate through shared variables in memory which allow them to read or write to the same memory location in the computer. Message passing multiprocessor computers, on the other hand, have a separate memory space for each processor. Processes communicate through messages to each other.

These computers may also be classified by how the memory is physically organized. In distributed memory computers, the memory is divided into modules physically placed near each processor. This placement provides each processor with faster access time to its local memory. By contrast, in centralized memory computers, the memory is physically located in just one location, generally equally distant in time and space from each of the processors. Both forms of memory organization use high-speed cache memory in conjunction with main memory to reduce execution time.

Multiprocessor computers with distributed shared memory are often organized into nodes with one or more processors per node. Also included in the node are local memory for the processors, a remote cache for caching data obtained from memory in other nodes, and logic for linking the node with other nodes in the computer. A processor in a node communicates directly with the local memory and communicates indirectly with memory on other nodes through the remote cache. For example, if the desired data is in local memory, a processor obtains the data directly from local memory. But if the desired data is stored in memory in another node, the processor must access its remote cache to obtain the data. A cache hit occurs if the data has been obtained recently and is presently stored in the cache. Otherwise a cache miss occurs, and the cache must obtain the desired data from the local memory in another node through the linking logic.

The linking logic between nodes is not bus-based, but takes the form of a network that transmits data packets between the nodes through multiple data paths. Data coherency is maintained among the nodes through an interconnect mechanism such as the Scalable Coherent Interface (SCI) interconnection mechanism (IEEE 1596) or equivalent.

Within each node, however, the processors, I/O devices, memory, and other agents communicate with each other through one or more node buses. One function of a node bus is to distribute interrupts from one agent to another. A separate interrupt bus may be provided for this purpose (although the function could be handled with other functions in one common bus). Whatever the implementation, each of the processors typically includes an interrupt mechanism (known as an interrupt interface) for transmitting and receiving interrupts from the others. The interrupt mechanism allows one processor to interrupt a second processor to perform a task of higher priority than the task currently being performed by the second processor. Interrupt schemes such as this are well developed for bus-based multiprocessor systems, such as the scheme described in U.S. Pat. No. 5,613,128.

Bus-based interrupt schemes, however, cannot communicate interrupts across the network of a multinode multiprocessor system because the nodes are not connected by a bus. (The difference between a bus and a network is well defined. See, for example, "Interconnection Networks," *Computer Architecture A Quantitative Approach,* $_2$nd Ed. (1996).) Instead, a second interrupt mechanism must be added to handle interrupts sent via the network from a processor on one node to a processor on another node. The obvious solution is to treat an interrupt like data and provide an interrupt register with a memory address in each node. A requesting processor in one node then interrupts a processor in a second node by writing an interrupt request to the address of the interrupt register in the second node. The request is then sent by way of the network to the second node. Hardware in the second node reads the interrupt register and places the interrupt request on the second node's bus for the second processor to read.

The major drawback of this approach is the complexity that results because two interrupt mechanisms are required. In addition to the extra hardware needed to maintain two mechanisms, the processors must be programmed to distinguish between interrupt destinations. If the requesting processor is generating an interrupt for a processor or for an I/0 device on the local node, the processor must know to utilize the interrupt controller and associated interrupt bus. But if the requesting processor is generating an interrupt for a processor on a remote node, hen the processor must recognize this as a different type of interrupt and write to the address of the remote node's interrupt register. A second drawback is the extra steps required for an I/O device on a local node to interrupt a processor on a remote node. The I/O device cannot write directly to the remote node's interrupt register, so it must first send the interrupt to a local processor. The local processor must then write the interrupt request to the desired interrupt register by way of the network and network protocol.

An objective of the invention, therefore, is to provide a single interrupt mechanism to communicate interrupts within and between nodes of a multinode multiprocessor system. This mechanism virtually extends the interrupt bus in each node to the other nodes in a manner that is transparent to the processor and I/O devices in the system. System performance is thereby increased without having to add to or modify existing bus-based interrupt mechanisms.

SUMMARY OF THE INVENTION

In accordance with the invention, apparatus for communicating an interrupt between nodes of a multinode computer system having a number of nodes connected by a network includes an interrupt controller and a state machine. The interrupt controller accepts an interrupt placed on a bus within the first node and intended for a second node, the interrupt having a first form suitable for transmission on the bus. The state machine takes the interrupt accepted by the interrupt controller and puts the interrupt into a second form suitable for transmission across the network to the second node. A temporary storage location is provided in the first node for storing the interrupt after acceptance by the interrupt controller and before transmission by the state machine.

A method according to the invention for communicating an interrupt between nodes includes the following steps. First it is determined that an interrupt placed on a bus in a first node by a node agent is intended for a second node, the interrupt having a first form suitable for transmission on the bus. The node agent is notified that the interrupt is accepted by the second node. The interrupt is then put into a second form suitable for transmission across the network to the second node. Preferably the notifying step occurs before the interrupt is transmitted to the second node.

The foregoing and other aspects, features, and advantages of the invention will become apparent from the following detailed description of a preferred embodiment, which proceeds with reference to the following drawings.

DETAILED DESCRIPTION OF A PREFERRED EMBODIMENT

Although the invention as described and shown herein is embodied in a particular type of multinode multiprocessor system, it should be understood that this is only a preferred embodiment of the invention. The invention can be implemented in any multiprocessor system that uses an interconnection network to connect the system's nodes.

Figure 1:
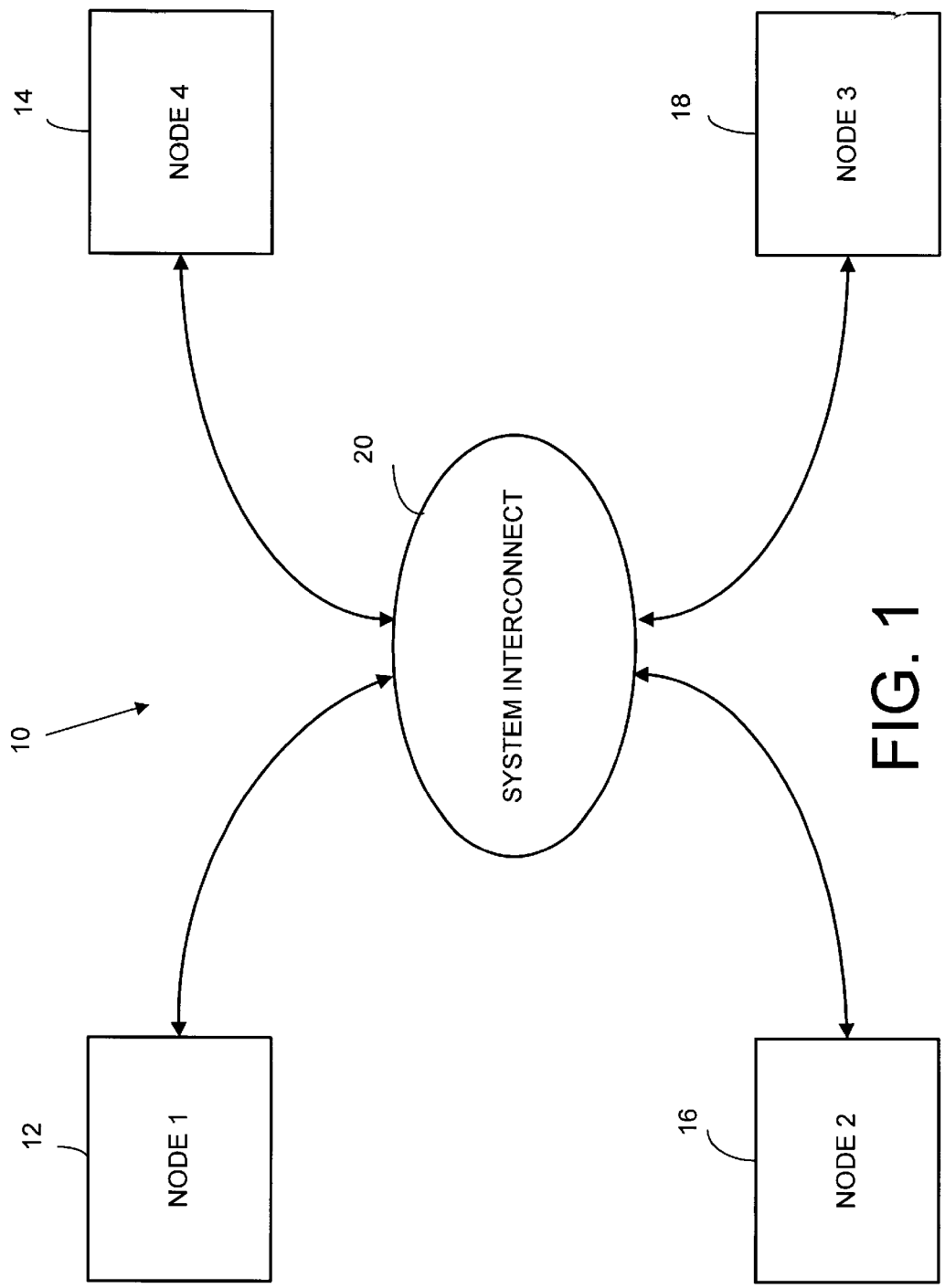
FIG. 1 is a block diagram of a multinode computer system in which the invention can be implemented

FIG. 1 is a block diagram of a multinode, multiprocessor computer system 10 in accordance with the invention. System 10 uses a computer architecture based on Distributed-Shared Memory (DSM). Four nodes 12–18 are shown connected by a system interconnect 20 that permits any node to communicate with any other node. Specifically, the purpose of interconnect 20 is to allow processors in any node to access the memory resident in any other node with cache coherency guaranteed. System interconnect 20 is a switch-based interconnection network that uses the Scalable Coherent Interface (SCI) interconnection mechanism. SCI is an IEEE-approved standard, or protocol (1596), well documented in a number of publications including IEEE Std 1596-1992 (Aug. 2, 1993) and Multiprocessor interconnection using SCI, a Master Thesis by Ivan Tving, DTH ID-E 579 (1994), both of which are hereby incorporated by reference.

Figure 2:
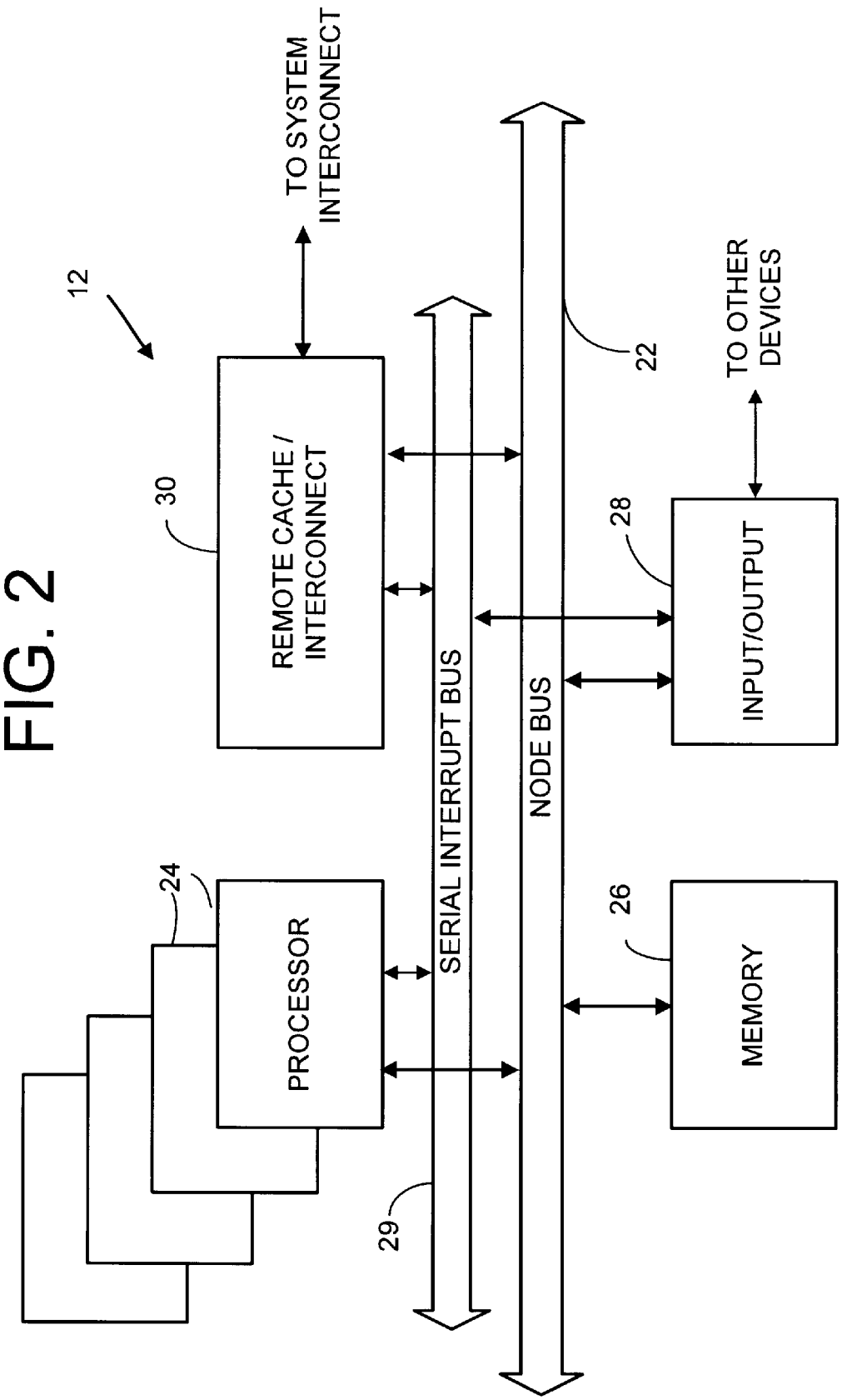
FIG. 2 is a block diagram of one of the nodes of the computer system of FIG. 1.

The physical links of interconnect 20 provide high bandwidth and low latency and are scalable to allow for the addition of more nodes. Links that meet these requirements include point-to-point interconnects with a data throughput of one gigabit/second or greater. The links can be configured in any number of suitable ways for connecting nodes 12–18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, Computer Sciences Technical Report #1058, University of Wisconsin—Madison A block diagram of exemplary node 12 of system 10 is shown in FIG. 2. The node includes a conventional symmetrical multiprocessor (SMP) node bus 22 for connecting multiple data processors 24 to local memory 26. For clarity, node 12–18 may be referred to as home (i.e., local) nodes or remote nodes in certain circumstances. A home node is one whose memory stores a memory block of interest (i.e., the address of the memory block falls within the address range supported by the local memory); all of the other nodes are then remote nodes with respect to that memory block. In the context of interrupts, a home or local node is also the node containing the interrupt bus and agents (data processors and I/O devices) generating the interrupt. A remote node receives the interrupts from a local node through a network link rather than through a physical connection to the interrupt bus. Additionally, a node may be a requesting node or a responding node. A requesting node is one requesting data; a responding node is one furnishing such data. Input/output (I/O) device 28, which is also connected to bus 22, connects the node to devices outside computer system 10 for communicating information between the computer system and the outside world. I/O device 28 can be of conventional design and includes means for connecting the node (and hence system 10) to personal computers, local area networks, etc., that wish to utilize the power of the multinode computer system. To connect node 12 to the other nodes in the system, the node includes an interconnect device 30. The device forms part of system interconnect 20 along with the physical links between nodes and the same devices on the other nodes of the computer system 10. In the present embodiment device 30 is constructed to implement the SCI standard for data communication between the nodes, allowing a processor on one node to access data stored on another node. Device 30 also contains a remote cache in the present embodiment, although this combination is not required for the invention. The remote cache could as well be separate from the interconnect device or not present at all.

The Interrupt Mechanism

Also interconnecting the data processors 24, the I/O device 28 and the interconnect device 30 is a local interrupt bus 29. This bus and interrupt controllers within these node agents form an interrupt mechanism in accordance with the invention which permits one of the agents to interrupt the operation of another. In the preferred embodiment the interrupt mechanism is based on the Advanced Programmable Interrupt Controller (APIC) architecture from Intel Corporation. However, the principles of this invention are readily applied to any bus-based interrupt mechanism.

Figure 3:
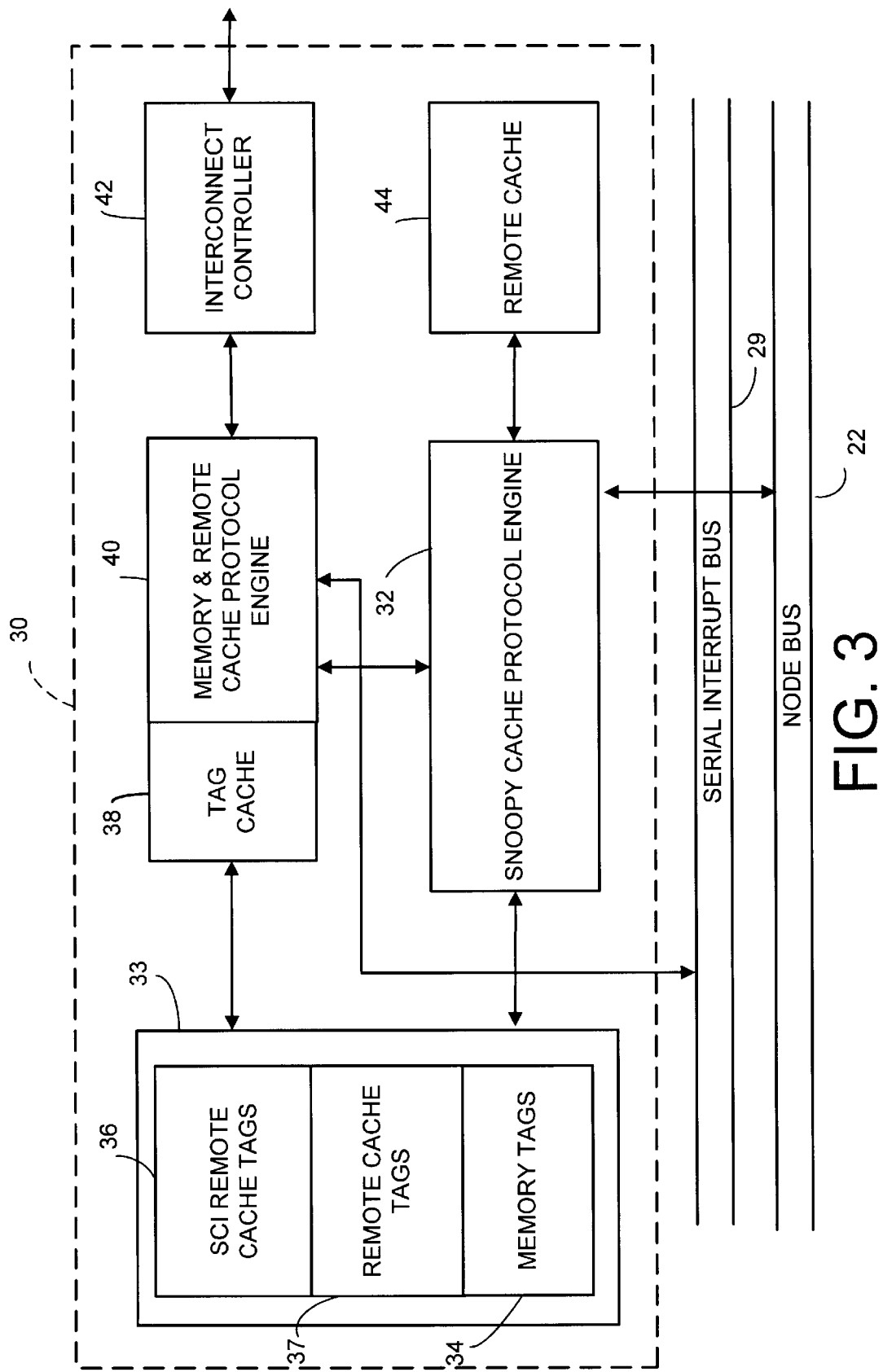
FIG. 3 is a block diagram of an interconnect device within the node of FIG. 2.

FIG. 3 is a block diagram showing the interconnect device 30 in more detail. The device includes a snoopy cache protocol engine 32; storage 33 for memory tags 34, SCI remote cache tags 36, and remote cache tags 37; a tag cache 38; a memory & remote cache protocol engine 40; an interconnect controller 42; and a remote cache 44. The node bus 22 connects to snoopy cache protocol engine 32, and serial interrupt bus 29 connects to memory & remote cache protocol engine 40.

Figure 4A:
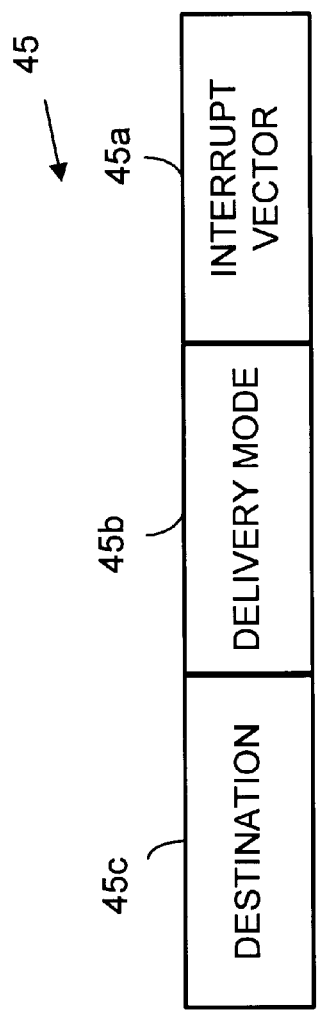
FIGS. 4A and B are diagrams showing, respectively, interrupt message packets communicated between agents within a node and packets communicated between nodes within the multinode computer system.

FIG. 4A is a diagram showing the pertinent fields within an interrupt message packet 45 of conventional format which is placed on bus 29 by an interrupt controller (other fields not significant to the invention are not shown). An Interrupt Vector field 45a identifies the service routine the receiving processor should execute and the priority of the interrupt. A delivery mode field 45b specifies how the interrupt controller recipient of the message packet should act upon reception of the interrupt. A destination field 45c identifies to the interrupt controllers within the local node the destination of the interrupt by node and node processor. These interrupt controllers are associated with processors 24, 1/0 device 28 and protocol engine 40 of a node and are connected to bus 29. All of these controllers can be of conventional design except for the interrupt controller of protocol engine 40. Its construction, which will be described, enables the controller to respond to bus-based interrupts intended for remote nodes.

Figure 4B:
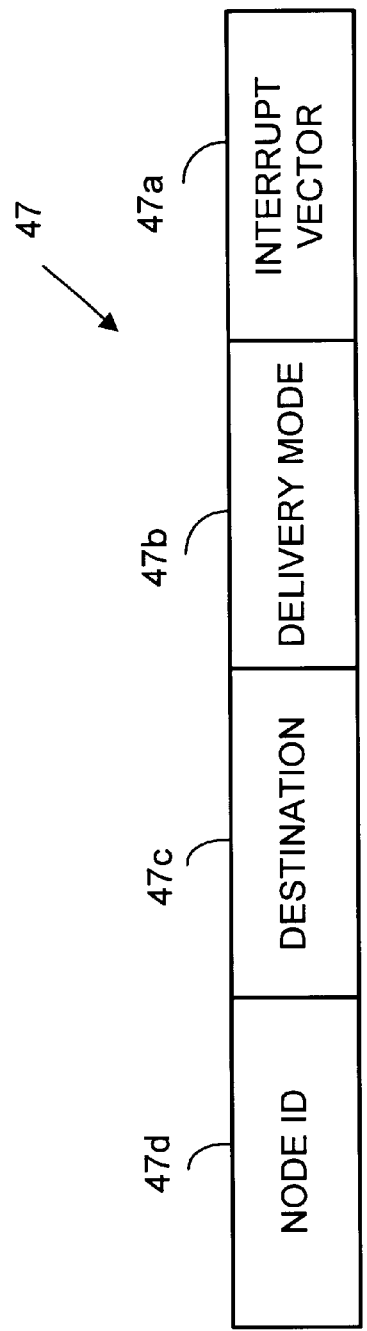

FIG. 4B is a diagram showing the pertinent fields within an interrupt message packet 47 that is transmitted from the local node to a remote node. It contains the same fields as packet 45 (relabeled as 47a–c) and an additional Node ID field 47d that further identifies the remote node destination. This further identification enables the remote nodes to determine for whom the packet, once it is placed on the network, is intended.

Figure 5:
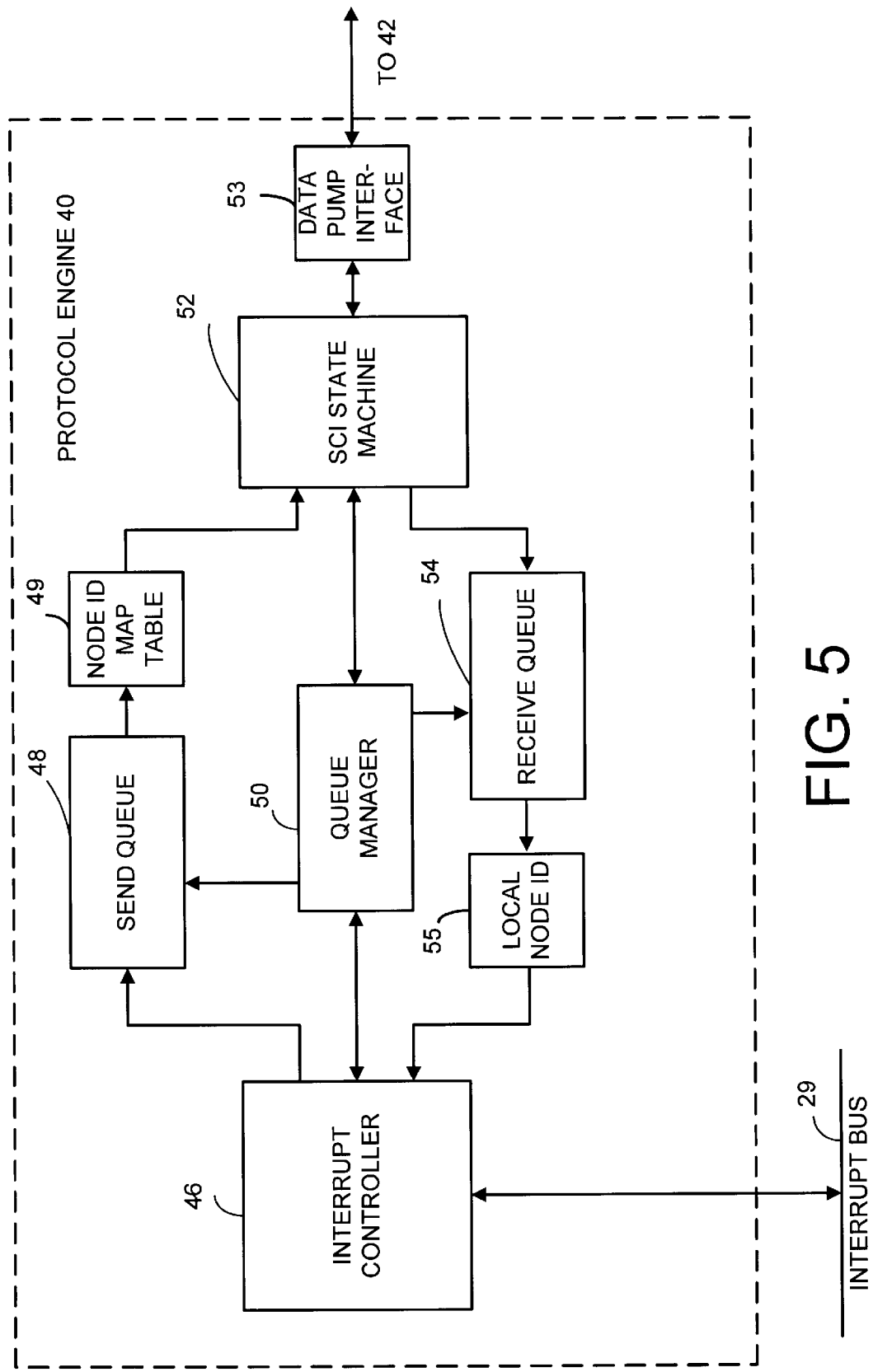
FIG. 5 is a block diagram of the pertinent portions of a protocol engine within the interconnect device of FIG. 3.

FIG. 5 is a block diagram of the portions of protocol engine 40 pertinent to this invention (other portions are omitted for clarity). These portions include on the sending side an interrupt controller 46; a send queue 48; a node ID map table 49; a queue manager 50; an SCI state machine 52; and a data pump interface 53. On the receive side these portions include data pump interface 53; state machine 52; receive queue 54; local node ID 55; queue manager 50; and interrupt controller 46. State machine 52 is intended to represent any device that is capable of taking an interrupt accepted by interrupt controller 46 and put it into a form suitable for transmission across the network to another node.

Communicating Interrupts Between Nodes

Figure 6:
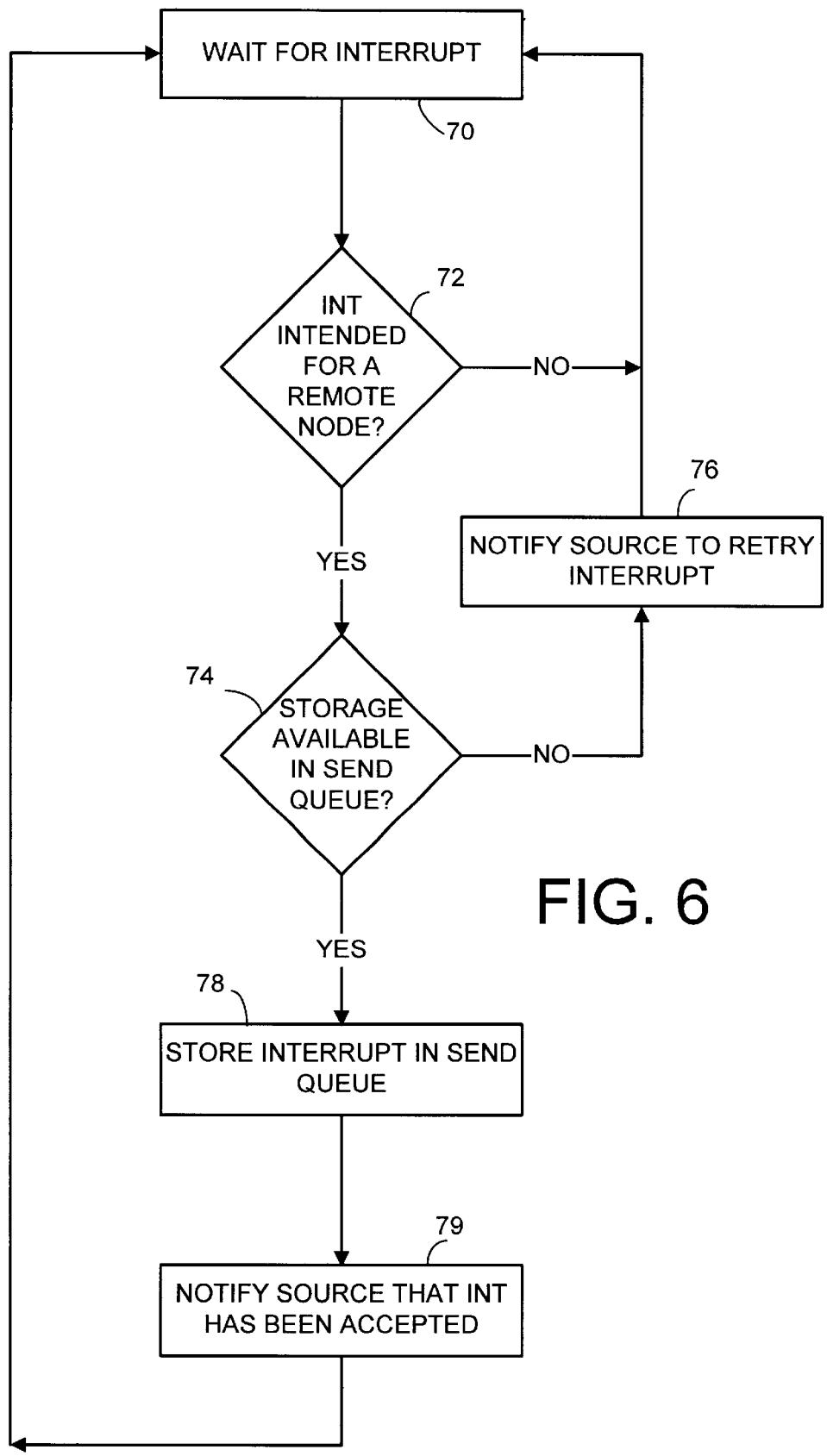
FIG. 6 is a flow chart of a method for accepting an interrupt from the local interrupt bus for transmission to a remote node.
Figure 7:
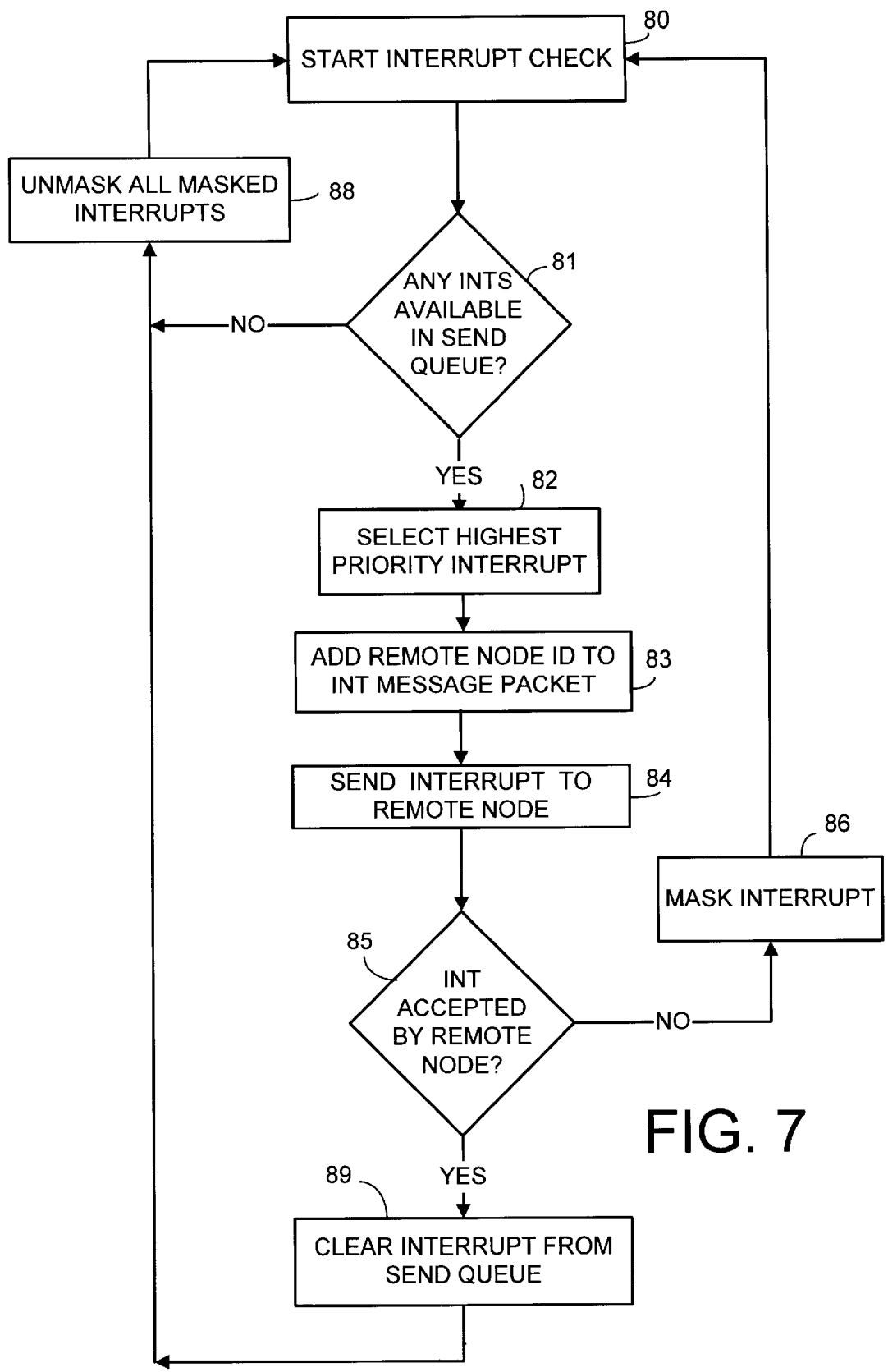
FIG. 7 is a flowchart of a method for transmitting the accepted interrupt to the remote node.

FIGS. 6–7 are flowcharts of steps that protocol engine 40 follows for communicating bus-based interrupts from the local node to a remote node. With reference to FIG. 6, interrupt controller 46, like the other interrupt controllers, waits for an interrupt that has been placed on bus 29 (step 70). But unlike the other interrupt controllers, interrupt controller 46 monitors bus 29 for interrupts intended for other nodes (step 72), reading destination field 45c to determine for whom the interrupt is intended. If field 45c indicates a node ID other than the local node, then controller 46 is the intended recipient. The controller then queries through queue manager 50 if space is available in send queue 48 for storing the interrupt (step 74). Queue 48 is preferably a temporary storage location such as memory that is configured to hold at least one interrupt message packet for each of at least 16 different interrupt priority levels, although other configurations can be used. If controller 46 is informed that space is not available, it responds to the interrupt by notifying the interrupt source to retry the interrupt later (step 76). This response and the retry are repeated until space in the queue becomes available and the interrupt is stored in the queue (step 78). Once the interrupt is stored, controller 46 notifies the interrupt source via bus 29 that the interrupt has been accepted (step 79). This notification occurs even though the interrupt may still be in queue 48 and not as yet have been transmitted to the remote destination node.

Referring to FIG. 7, SCI state machine 52 periodically checks queue manager 50 to determine if any interrupts stored in send queue 48 need to be transmitted to a remote node (step 80). The state machine looks in the queue for any available interrupt (step 81). In the present embodiment an interrupt is available if it meets three conditions: the interrupt is present in the send queue, it is not masked, and the state machine is not already in the process of servicing the interrupt. A masked interrupt is one that has been temporarily marked to indicate that an attempt to send it previously to its destination was unsuccessful.

If the state machine finds an available interrupt in the queue, it selects the one with the highest priority (step 82) and adds the remote node ID field 47d to the interrupt's message packet (step 83). The state machine then sends the interrupt as an SCI message through data pump interface 53 to interconnect controller 42 for transmission to the identified remote node (step 84).

Success in sending an interrupt between nodes depends upon a number of factors, such as how much traffic is on the network at the time and whether the receive queue in the remote node for which the interrupt is intended has space available to receive the interrupt. State machine 52 is notified by the destination node whether the interrupt has been accepted (step 85). If the interrupt is not accepted, the state machine masks the interrupt to remove it temporarily from further consideration (step 86). The state machine then checks the send queue for lower priority interrupts to send (steps 80–85). If the state machine reaches a point where there are no more available interrupts (step 81), it unmasks all masked interrupts (step 88) to make them available and begins again with the highest priority interrupt (step 82). When the state machine eventually successfully sends an interrupt, it clears the interrupt from the send queue (step 89), also unmasks all masked interrupts (step 88), and begins the sending process again by looking for any available interrupts in the send queue (step 80).

Figure 8:
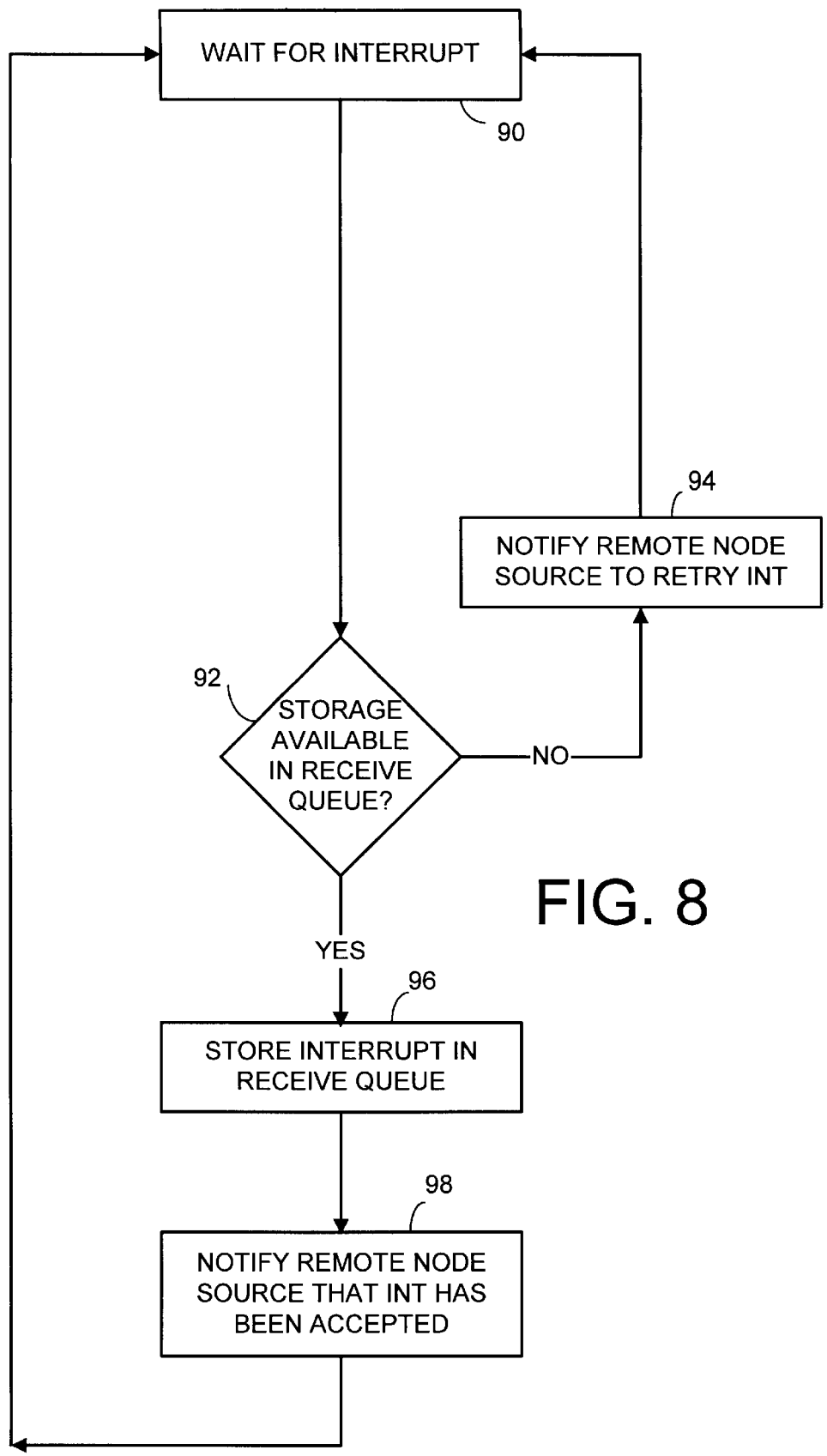
FIG. 8 is a flow chart of a method for accepting an interrupt from a remote node for placing on the local interrupt bus.

The process for receiving an interrupt from a remote node is similar to the sending process, with the roles of interrupt controller 46 and state machine 52 essentially reversed. Referring to FIG. 8, state machine 52 awaits the arrival of interrupts from remote nodes (step 90). When the state machine detects an interrupt, it checks with queue manager 50 to determine if space is available for storing the interrupt in receive queue 54 (step 92). Queue 54 is similar in design to queue 48 and contains at least one storage location for each interrupt level. If the received interrupt's storage location in the queue is occupied, the state machine notifies the interrupt source to retry the interrupt (step 94) and again awaits the arrival of interrupts (step 90). This response and the retry are repeated until space in the receive queue becomes available and the state machine accepts the interrupt. At this point the state machine strips off the remote node ID field 47*d* from the interrupt packet and stores the rest of the packet in the queue (step 96). Once the interrupt is stored, the state machine notifies the remote node that the interrupt has been accepted (step 98).

Figure 9:
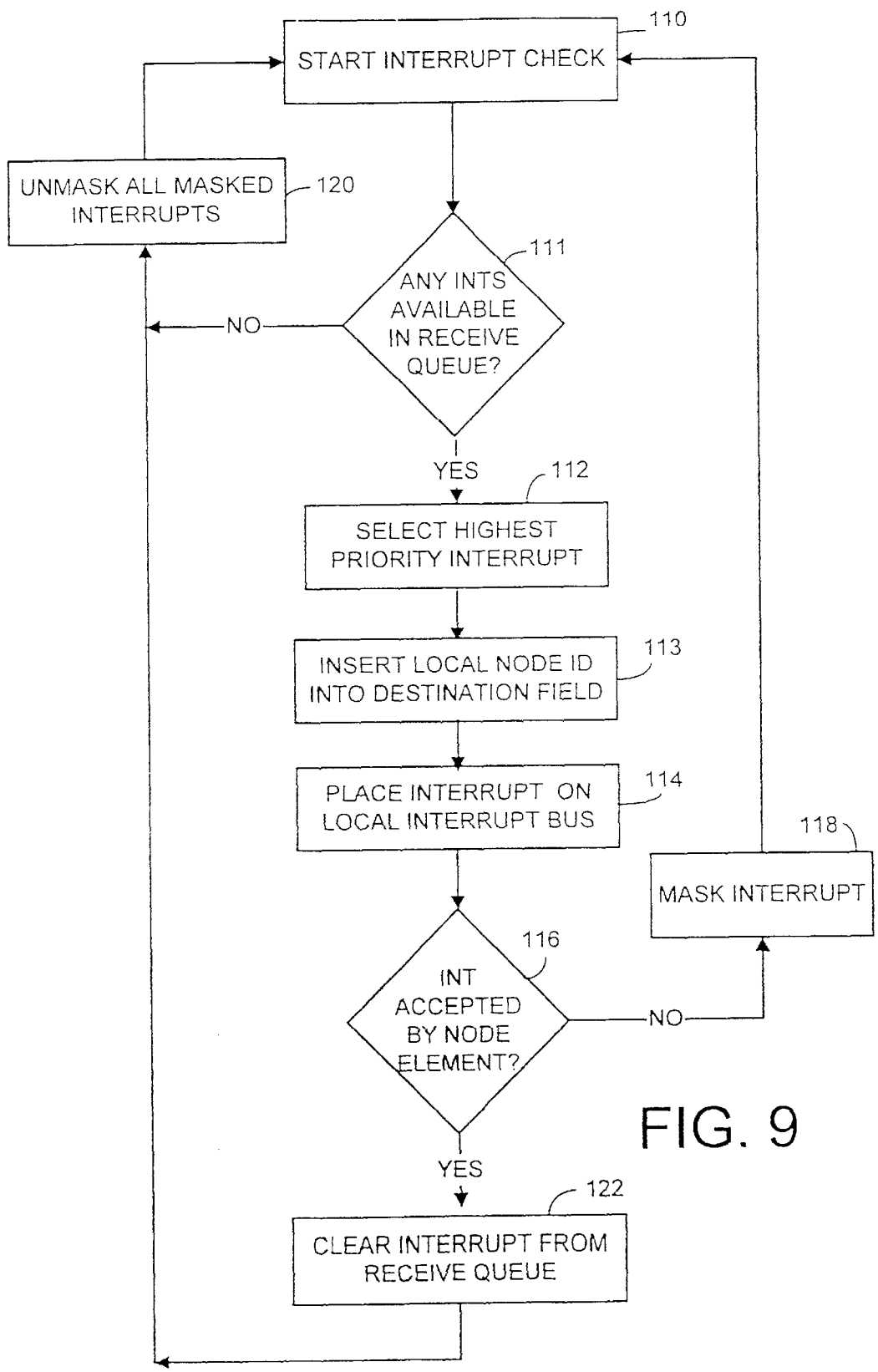
FIG. 9 is a flow chart of a method for placing the accepted interrupt on the local interrupt bus.

FIG. 9 shows the steps taken by interrupt controller 46 to place interrupts stored in receive queue 54 onto bus 29. The controller periodically checks with the queue manager for interrupts received from other nodes (step 110). From this check it determines through queue manager 50 if any interrupts are available in receive queue 54 (step 111). The controller then selects the highest priority interrupt (step 112) and inserts in its destination field 45*c* the local node ID (step 113). The -controller thereafter places the interrupt onto local interrupt bus 29 (step 114) to broadcast the interrupt to all of the node processors and I/O devices coupled to the bus through an interrupt controller. The intended recipient of the interrupt, such as data processor 24 or I/O device 28, responds to the now bus-based interrupt by accepting the interrupt or notifying controller 46 that the interrupt should be retried (step 116). If the interrupt is not accepted, interrupt controller 46 masks the interrupt to remove it temporarily from further consideration (step 118). The controller then checks receive queue 54 for lower priority interrupts to send (steps 110–116). If controller 46 reaches a point where there are no more available interrupts in queue 54 (step 111), it unmasks all masked interrupts to make them available (step 120) and begins again with the highest priority interrupt in the receive queue (step 112).

The interrupt controller 46 eventually is successful in sending the interrupt across bus 29 and clears the interrupt from the receive queue (step 122). The controller then unmasks all masked interrupts and again checks for interrupts to send (steps 110–116).

The Queue Manager

Figure 10A:
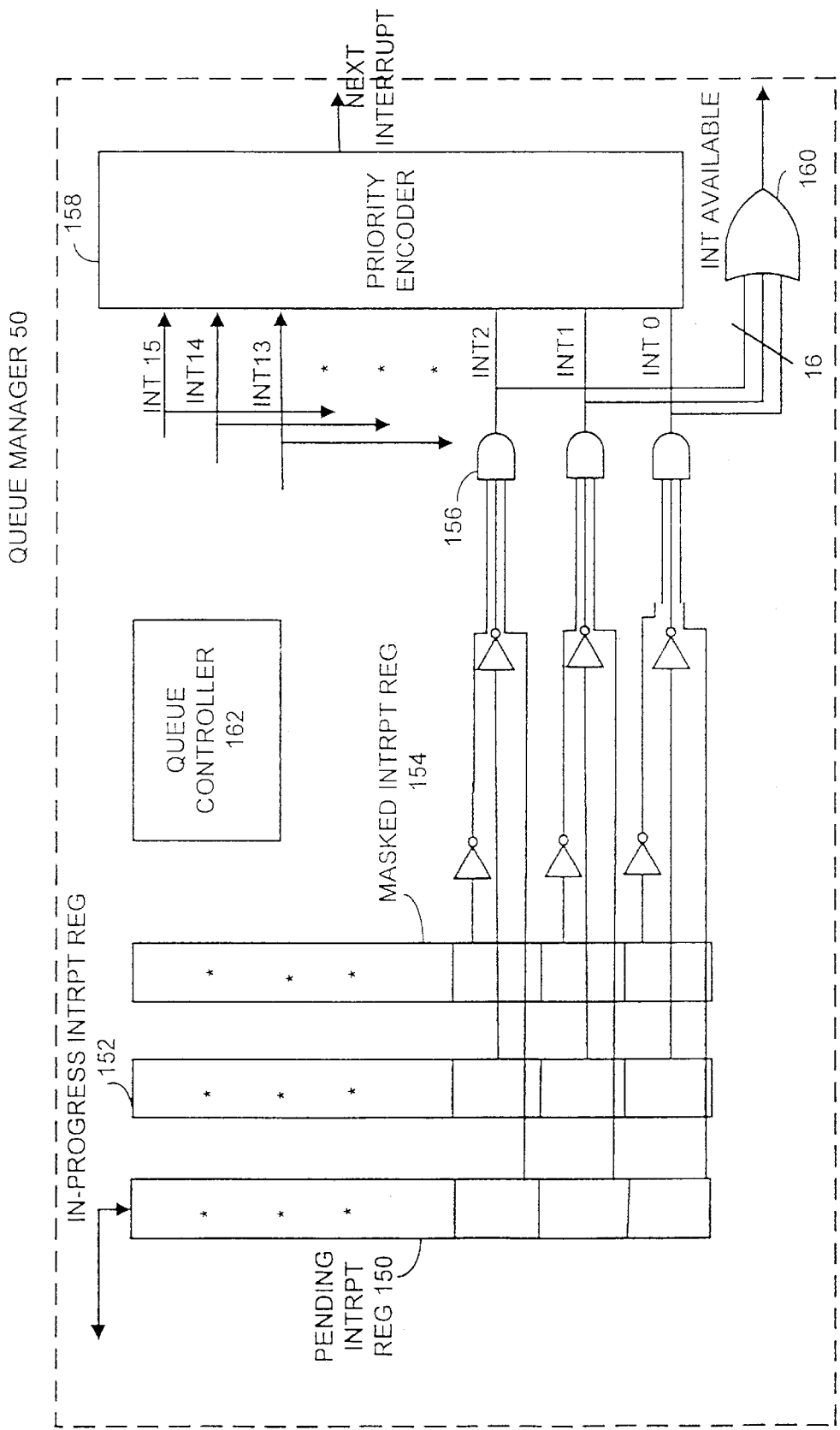
FIGS. 10A and B are block diagrams of the queue manager block of FIG. 5.
Figure 10B:
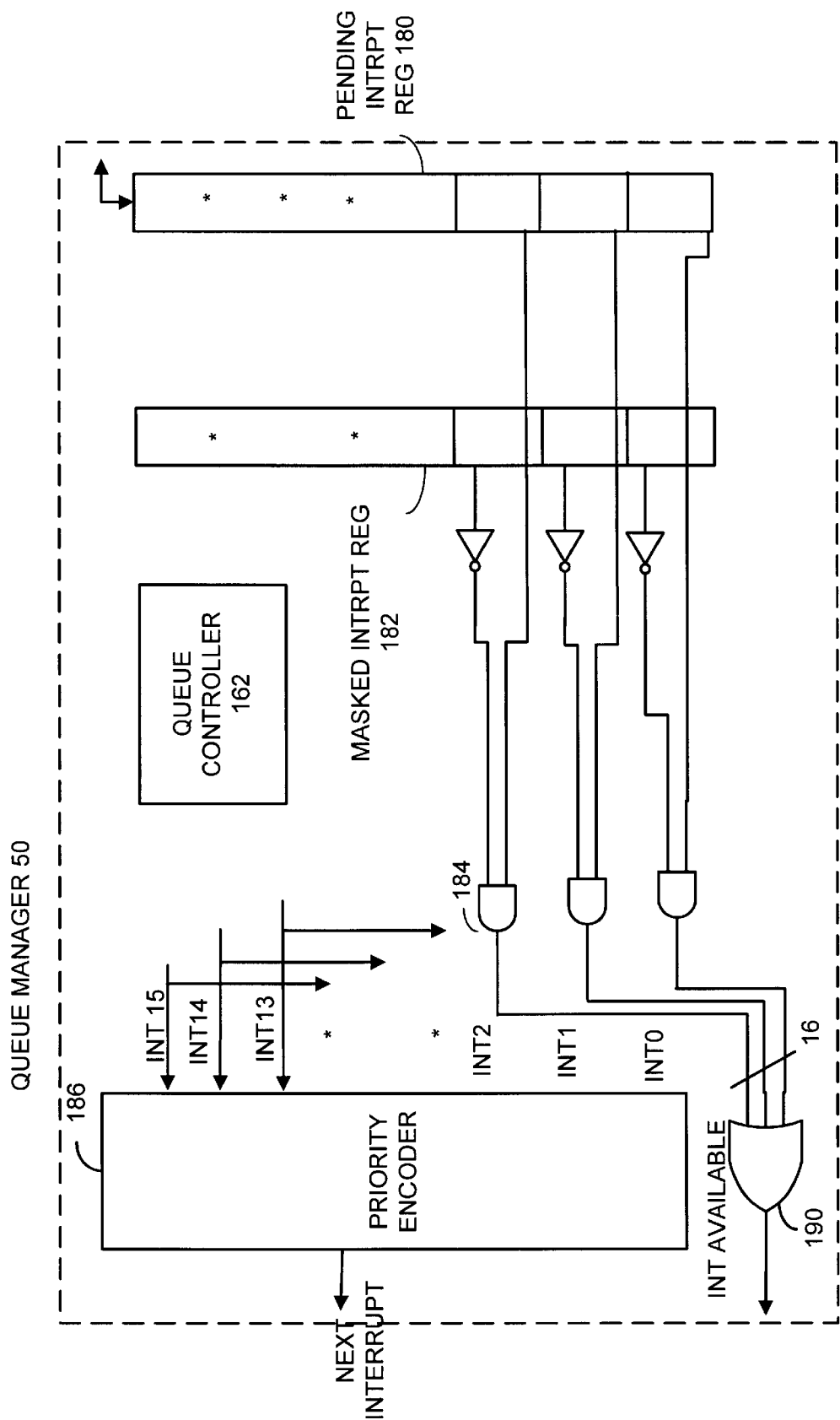

Queue manager 50 can be constructed in any number of ways to perform the functions ascribed to it above. FIGS. 10A and 10B show a preferred construction. FIG. 10A is a block diagram of the portion of queue manager 50 that handles the sending of interrupts to remote nodes; FIG. 10B is a block diagram of the portion of queue manager 50 that handles the receiving of interrupts from remote nodes.

Referring to FIG. 10A, queue manager includes a pending interrupt register 150, an in-progress register 152, and a masked interrupt register 154. Each of these registers holds at least 16 bits, one for each interrupt priority level, though for clarity only several register locations are shown specifically. The register locations corresponding to each priority level are logically combined at AND gates 156 to produce an interrupt available signal for each interrupt level, such as Int2. These signals are fed into a priority encoder 158 that selects the number of the highest priority interrupt available and signals that number as a Next Interrupt signal to state machine 52. The Int signals are also logically combined at an OR gate 160 to produce a common Interrupt Available signal for alerting state machine 52 that an interrupt is available for transmission to a remote node. Communications between this portion of queue manager 50 and interrupt controller 46 or state machine 52 are handled through a queue controller 162.

Registers 150, 152, and 154 together determine which interrupts are available to the state machine for transmission to a remote node. Register 150 indicates if an unsent interrupt is stored in send queue 48. Its bits are individually set and cleared by the queue controller in response to signals from interrupt controller 46. Register 152 indicates if state machine 52 is in the process of servicing an interrupt. Its bits are individually set by the queue controller in response to signals from state machine 52 and are individually cleared when the state machine signals that the servicing is complete. Register 154 indicates if an interrupt has been unsuccessfully sent to its intended destination. Its bits are individually set by queue controller 162 in response to signals from state machine 52. Its bits remain set until the state machine signals the queue controller to clear the entire register. Thus only interrupts that are pending in queue 48 (register 150 bit set) but are not in progress (register 152 bit clear) or not masked (register 154 bit clear) are available. It is these interrupts that priority encoder 158 considers in generating its Next Interrupt signal, taking the highest priority of these interrupts first.

In terms of the process for sending an interrupt to a remote node, interrupt controller 46 checks the status of the bit in register 150 corresponding to the priority level of the interrupt detected to determine if storage is available in send queue 48. If storage is available (as indicated by the bit status), the controller signals the queue controller to store the interrupt in queue 48 and to set the bit to prevent overwriting of the interrupt just stored. State machine 52 checks the common Interrupt Available signal when looking for interrupts to service. When the Interrupt Available signal is present, the state machine reads the Next Interrupt signal from priority encoder 158 to select the appropriate interrupt from the send queue. If the state machine finds that there are no more unmasked interrupts available, it signals queue controller 162 to clear all bits in register 154. Similarly, if the state machine successfully sends a lower priority interrupt, it signals the queue controller to clear these register bits.

FIG. 10B is similar to FIG. 10A and includes a pending interrupt register 180 and a masked interrupt register 182 but no in-progress register. Each of registers 180 and 182 holds at least 16 bits, one for each interrupt priority level. The register locations corresponding to each level are logically combined at AND gates 184 to produce an Interrupt Available signal for each interrupt level, such as Int0. These signals are fed into a priority encoder 186 that selects the number of the highest priority interrupt available and signals that number as a Next Interrupt signal to interrupt controller 46. The Int signals are also logically combined at an OR gate 190 to produce a common Interrupt Available signal for alerting the interrupt controller that an interrupt is available for placing on bus 29. Communications between this receiving portion of the queue manager and interrupt controller 46 or state machine 52 are also handled through the queue controller 162.

Registers 180 and 182 together determine which interrupts are available to interrupt controller 46 for placement on bus 29. Register 180 indicates if an unsent interrupt is stored in receive queue 54. Its bits are set and cleared individually by the queue controller in response to signals from state machine 52. Register 182 indicates if an interrupt has been unsuccessfully sent to its intended destination on bus 29. Its bits are set individually by queue controller 162 in response to signals from interrupt controller 46. Its bits remain set until the interrupt controller signals the queue controller to clear the entire register. Thus only interrupts that are pending in queue 54 (register 180 bit set) but are not masked (register 182 bit clear) are available. It is these interrupts that priority encoder 186 considers in generating its Next Interrupt signal, taking the highest priority of these interrupts first.

In terms of the process for receiving an interrupt from a remote node and placing it on the local interrupt bus, state machine 52 checks the status of the bit in register 180 corresponding to the priority level of the interrupt detected to determine if storage is available in the receive queue. If storage is available (as indicated by the bit status), the state machine signals the queue controller to store the interrupt in queue 54 and to set the bit to prevent overwriting of the interrupt just stored. Interrupt controller 46 checks the common Interrupt Available signal when looking for interrupts to place on bus 29. When the Interrupt Available signal is present, the interrupt controller reads the Next Interrupt signal from priority encoder 186 to select the appropriate interrupt from the receive queue. If the interrupt controller finds that there are no more unmasked interrupts available, it signals the queue controller to clear all bits in register 182. Similarly, if the interrupt controller successfully places a lower priority interrupt on bus 29, it signals the queue controller to clear these register bits.

Having illustrated and described the principles of the invention in a preferred embodiment, it should be apparent to those skilled in the art that the preferred embodiment can be modified in arrangement and detail without departing from these principles. For example, the design of the queue manager can be changed as desired to meet the needs of a particular implementation. The method of selecting interrupts can be varied. Hardware aspects of the embodiment such as the state machine may be implemented in software and vice versa. The invention may be used in multiprocessor computer systems with single or multiple processors per node.

In view of these and the many other possible embodiments to which the principles of the invention can be applied, it should be understood that the following claims and not the preferred embodiment define the full scope of the invention. I therefore claim as my invention all that comes within the spirit and scope of these claims.

I claim:

1. A multinode computer system comprising:
at least two nodes connected by a network, each of the two nodes having multiple node agents and a bus transmitting interrupts between node agents;
   an interrupt controller accepting only an interrupt placed on the bus in the first node and intended for a node agent in a second node, the interrupt having a first form suitable for transmission on the bus to a node agent in the first node, the interrupt controller notifying a source of the interrupt that the interrupt has been accepted before the interrupt has been transmitted across the network to the second node; and
   a state machine taking the interrupt accepted by the interrupt controller and putting the interrupt into a second form suitable for transmission across the network to the second node.

2. The system of claim 1 wherein the interrupt controller and state machine are located within the first node.

3. The system of claim 1 including a temporary storage location for storing the interrupt after acceptance by the interrupt controller and before transmission by the state machine.

4. The system of claim 3 including:
an in-progress register which records whether an interrupt stored in the temporary storage location is being serviced; and
a priority encoder for determining a priority in which interrupts stored in the temporary storage location are sent through the state machine to the second node, the priority encoder checking the pending in-progress register in selecting an interrupt.

5. The system of claim 3 including:
a pending interrupt register which records whether an interrupt is stored in the temporary storage location; and
a priority encoder for determining a priority in which interrupts stored in the temporary storage location are sent through the state machine to the second node, the priority encoder checking the pending interrupt register in selecting an interrupt.

6. The system of claim 3 including:
a masked interrupt register which records whether an interrupt stored in the temporary storage location has been unsuccessfully sent to the second node; and
a priority encoder for determining a priority in which interrupts stored in the temporary storage location are sent through the state machine to the second node, the priority encoder checking the masked interrupt register in selecting an interrupt.

7. The system of claim 3 including a second temporary storage location for storing an interrupt received from the second node for a node agent in the first node.

8. The system of claim 7 including:
a pending interrupt register which records whether an interrupt is stored in the second temporary storage location; and
a priority encoder for determining a priority in which interrupts stored in the second temporary storage location are sent via the bus in the first node to a node agent therein, the priority encoder checking the pending interrupt register in selecting an interrupt.

9. The system of claim 7 including:
a masked interrupt register which records whether an interrupt stored in the second temporary storage location has been unsuccessfully sent to a node agent; and
a priority encoder for determining a priority in which interrupts stored in the second temporary storage location are sent via the bus in the first node to a node agent therein, the priority encoder checking the masked interrupt register in selecting the interrupt.

10. In a multinode computer system, a method for communicating an interrupt between nodes, the method comprising:
determining that an interrupt placed on a bus in a first node by a node agent therein is intended for a node agent in a second node, the interrupt having first form suitable for transmission on the bus to another node agent in the first node;
notifying the node agent that placed the interrupt that the interrupt has been accepted by the second node before the interrupt is transmitted to the second node; and
putting the interrupt into a second form suitable for transmission across a network to the second node.

11. The method of claim 10 wherein putting the interrupt into a second form suitable for transmission across the network includes adding a second node ID to the interrupt.

12. The method of claim 10 including:
storing the interrupt as one of a number of interrupts of different priority for communication to the second node; and
selecting an interrupt from the stored interrupts for transmission across the network according to a priority scheme.

13. The method of claim 10 including:
recording whether an interrupt has been unsuccessfully sent to the second node; and determining a priority in which stored interrupts are sent to the second node by checking which interrupts are recorded as having been unsuccessfully sent.

14. The method of claim 10 including:

determining that an interrupt received from a second node is intended for a node agent in the first node;

putting the received interrupt into a form suitable for placing on the bus in the first node; and notifying the node agent via the bus of the interrupt.

15. The method of claim 10 wherein the step of putting the received interrupt into a form suitable for placing on the bus comprises changing a node ID of the interrupt.

16. A multinode computer system comprising:

at least two nodes connected by a network, each of the two nodes having multiple node agents and a bus transmitting interrupts between node agents;

an interrupt controller accepting only interrupts placed on the bus in a first node and intended for a node agent on a second node, the interrupt having a first form suitable for transmission on the bus to a node agent in the first node, the interrupt controller notifying a source of the interrupt that the interrupt has been accepted before the interrupt has been transmitted across the network to the second node;

a send queue in the first node storing the interrupts accepted by the interrupt controller;

a pending interrupt register in the first node recording whether an interrupt is stored in the send queue;

an in-progress register in the first node recording whether an interrupt is already being serviced;

a masked interrupt register in the first node recording whether the interrupt has been unsuccessfully sent to another node;

a priority encoder in the first node determining a priority in which interrupts stored in the send queue are sent to other nodes, the priority encoder checking the pending interrupt register, the in-progress register, and the masked interrupt register in selecting an interrupt; and a state machine in the first node putting an interrupt from the send queue into a form suitable for transmission across the network to another node.

17. The system of claim 16 wherein the state machine accepts interrupts from other nodes, the system further including:

a receive queue in the fist node storing the accepted interrupts;

a second pending interrupt register in the first node recording whether an interrupt is stored in the receive queue;

a second masked interrupt register in the first node recording whether a received interrupt has been unsuccessfully sent to the bus;

a second priority encoder in the first node determining a priority in which interrupts stored in the receive queue are sent to node agents in the first node, the priority encoder checking the pending interrupt register and the masked interrupt register in selecting an interrupt; and the interrupt controller in the first node putting interrupts from the receive queue into a form suitable for transmission on the bus to a node agent in the first node.

18. In a multinode computer system, a method for communicating an interrupt between nodes, the method comprising:

determining that an interrupt placed on a bus in a first node by a node agent therein is intended for a node agent in a second node, the interrupt having first form suitable for transmission on the bus to another node agent in the first node;

storing the interrupt with other interrupts for transmission to other nodes;

notifying the node agent that placed the interrupt that the interrupt has been accepted by another node before transmission of the interrupt to the other node; and putting the interrupt into a second form suitable for transmission across a network to the other node.

19. The method of claim 18 including:

determining that an interrupt received from another node is intended for a node agent in the first node, the interrupt having second form suitable for transmission across the network;

storing the received interrupt with other interrupts for placing on a bus in the first node, the stored interrupts having different priorities;

notifying the other node that the interrupt is accepted by the node agent in the first node before placing the interrupt on the bus;

selecting an interrupt from among the stored interrupts to place the interrupt on the bus according to a priority scheme; and putting the selected interrupt into a first form suitable for transmission on the bus to an intended node agent in the first node.

20. In a multinode computer system, a method of communicating interrupts between nodes, the method comprising:

providing at least two nodes connected by a network, each of the two nodes having multiple node agents and a bus transmitting interrupts between node agents;

accepting only an interrupt placed on the bus in the first node and intended for a node agent in a second node, the interrupt having a first form suitable for transmission on the bus to a node agent in the first node;

notifying the node agent that placed the interrupt that the interrupt has been accepted by another node before transmission of the interrupt to the other node; and taking the interrupt accepted by the interrupt controller and putting the interrupt into a second form suitable for transmission across the network to the second node.

* * * * *

UNITED STATES PATENT AND TRADEMARK OFFICE
CERTIFICATE OF CORRECTION

PATENT NO. : 6,247,091 B1
DATED : June 12, 2001
INVENTOR(S) : Thomas D. Lovett

Page 1 of 1

It is certified that error appears in the above-identified patent and that said Letters Patent is hereby corrected as shown below:

Title page,
Title, after "COMMUNICATING INTERRUPTS" insert
-- OVER A NETWORK --.

Signed and Sealed this

Fifteenth Day of January, 2002

Attest:

JAMES E. ROGAN
Attesting Officer
Director of the United States Patent and Trademark Office